Sept. 11, 1923.
W. W. TUTTLE
EXPANDING ARBOR
Filed June 4, 1920
1,467,821
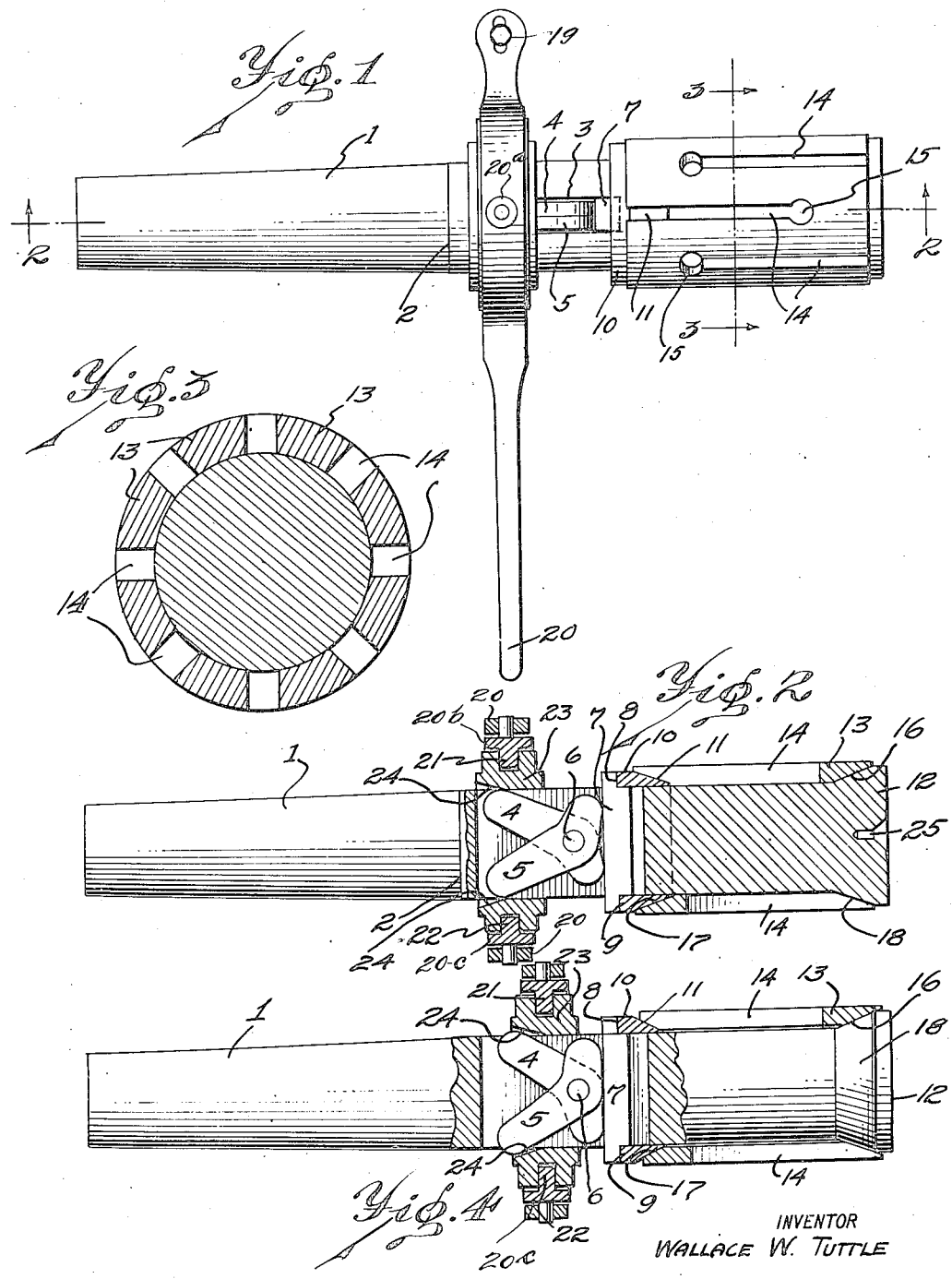
INVENTOR
WALLACE W. TUTTLE
BY
Charles E. Vinson
ATTORNEY Patented Sept. 11, 1923.

1,467,821

UNITED STATES PATENT OFFICE.

WALLACE W. TUTTLE, OF DETROIT, MICHIGAN.

EXPANDING ARBOR.

Application filed June 4, 1920. Serial No. 386,467.

*To all whom it may concern:*

Be it known that I, WALLACE W. TUTTLE, a citizen of the United States, residing at Detroit, county of Wayne, State of Michigan, have invented a certain new and useful Improvement in Expanding Arbors, and declare the following to be a full, clear, and exact description of the same, such as will enable others skilled in the art to which it pertains to make and use the same, reference being had to the accompanying drawings, which form a part of this specification.

This invention relates to expanding arbors, and the object of the invention is to provide an expanding arbor having a solid one-piece spindle which may be secured head and tail stocks either between, or the tapered end may be inserted in the spindle of a machine and which is provided with an expanding member which, by operation of a lever, may be expanded to secure the work thereon. This device is for use in releasably holding a piece of work, the work of whatever character being provided with a central aperture adapted to be slipped over the expanding member, whereby the article is accurately centered and secured relative to the center of rotation. When the operation is completed the expanding member is contracted and the material removed at which time another piece may be positioned thereon and the arbor expanded. In this manner the necessity of securing each piece of work separately in a chuck and centering it therein is avoided, the expanding arbor being always centered and secured in position. Thus a great saving of time is effected, it being only necessary to move the lever to contract or expand the arbor when securing each piece thereon and the actual work on the material may be almost continuous. These objects and the several novel features of the invention are hereinafter more fully described and claimed and the preferred form of construction by which these objects are attained is shown in the accompanying drawings in which—

Fig. 1 is a plan view of an expanding arbor embodying my invention.

Fig. 2 is a section taken on line 2—2 of Fig. 1.

Fig. 3 is an enlarged section taken on line 3—3 of Fig. 1.

Fig. 4 is a section similar to Fig. 2 showing the position assumed by the parts before the work is secured thereon.

The arbor consists of a solid tapered spindle 1 which is tapered from the line 2 to the extreme end thereof and the spindle is provided with a longitudinal slot 3 therethrough in which is mounted a pair of levers 4 and 5 pivoted on the pin 6 between the sides of the slots 3. Also positioned in the said slot is a bar 7 notched at each end 8 and 9 to receive the edges of the annular member 10 which is provided with a tapered face 11, the member 7 being secured to the member 10 at each end. About the spindle between the end of the slot 3 and the end 12 of the spindle is an annular spring member 13, which as will be seen from Figs. 1 and 3, is provided with alternate slots 14 cut in from the opposite ends thereof and each ending in an enlarged aperture 15. The member 13 is provided with tapering internal faces 16 and 17 at each end thereof, the tapered face 11 of the member 10 fitting the tapered face 17 in the member 13 and the tapered end 18 of the spindle fitting the tapered face 16 of the member 13. Pivoted at 19 is a lever 20 apertured at 20$^a$ on opposite sides to receive pins on each of the two half rings 20$^b$ and 20$^c$ fitting the grooved annular member 23 positioned about the spindle and adapted to take normally the position shown in Fig. 4. This member 23 is provided with an internal tapered face 24 which is adapted to engage the ends of the levers 4 and 5.

In operation the article to be operated on, which is to be understood as having a central aperture, is placed over the expanding member 13 of the device, the parts of the device being positioned as shown in Fig. 4 at this time. When the article has been placed on the expanding member 13, the operator, by movement of the lever 20 on the pivot 19, moves the member 23 to the position shown in Fig. 2, the tapered face 24 thereof engaging the ends of the levers 4 and 5 and bringing them together, which action forces the bar 7 and the tapered annular member 10 forward into the end of the member 13, expanding the member 13 as shown in Fig. 2 by causing the ends of the member 13 to ride outwardly on the tapered face 11 of the annular member 10. Due to this operation and expansion of the member 13 the inner periphery of the material at the central aperture thereof is tightly engaged by the member 13 thereby holding the same tightly on the central spindle. When the member 23 is moved back to the position shown in Fig. 4 the inherent tendency of the spring member 13 to contract forces the annular member 10 to the position shown which forces the ends of the levers 4 and 5 outwardly in which position the work may be removed from the spring member 13 and a new piece placed thereon. In use the tapered portion 1 of the spindle may be used to replace the live center of a head stock and, in cases where extreme pressure is applied to the work on the expanding end of the spindle, a tail stock may be used having a center fitting the aperture 25 in the said spindle end thereby solidly and accurately supporting the material to be worked.

From the foregoing description it becomes evident that the device, while simple in construction is very efficient in operation, of comparative cheapness of manufacture, accomplishes the objects desired and provides an expanding arbor having a solid spindle of great strength and which will not easily get out of order. By the means for and method described of expanding the sleeve uniformly throughout its length, it is evident that work supported thereon may be finished accurately concentric with the aperture through which the sleeve is positioned.

Having thus briefly described my invention, its utility and mode of operation, what I claim and desire to secure by Letters Patent of the United States is—

1. In an arbor, a solid spindle provided with a slot, a pair of levers pivotally mounted therein, an annular member having a tapered peripheral face, a bar secured to the said annular member and extending through the slot, a shifting member about the spindle adjacent the slot having an internal tapered face adapted to engage the ends of the levers, an annular spring member engaging over the end of the spindle, the extreme end of the spindle being enlarged and provided with a tapered face, the spring member having a companion tapered face, and a lever whereby the shifting member may be moved to actuate the levers and expand the spring member.

2. In an arbor, a solid one-piece spindle, the extreme end thereof being provided with a tapered face, an annular spring member provided with tapered faces at each end thereof, one of said faces being adapted to fit the tapered face on the spindle, an annular member having a tapered face adapted to fit the tapered face at the opposite end of the spring member, said spindle being provided with a slot, a bar fitting in the slot being secured at each end to the said annular member, a pair of levers engaging the said bar and means for moving the ends of the said levers together to expand the annular spring member.

3. In an arbor, a solid one piece spindle having a tapered end for a headstock, the opposite end thereof being provided with a conical face, an annular spring member having longitudinal slots extending thereinto from each end alternately to beyond the center and having a tapered face at each end, a cone-shaped member slidably mounted on the spindle and fitting an end of the spring member, said spindle having a slot, a pivoted lever in the slot, and means whereby movement of the lever in one direction moves the slidable coned member to expand the spring member.

In testimony whereof, I sign this specification.

WALLACE W. TUTTLE.